United States Patent
Harkey (10) Patent No.: US 7,124,536 B2
(45) Date of Patent: Oct. 24, 2006

(54) FISHING ROD HOLDING APPARATUS AND METHOD

(76) Inventor: Jim Harkey, 636 Hi-Crest Dr. West, Auburn, WA (US) 98001

( * ) Notice: Subject to any disclaimer, the term of this patent is extended or adjusted under 35 U.S.C. 154(b) by 0 days.

(21) Appl. No.: 10/797,967

(22) Filed: Mar. 11, 2004

(65) Prior Publication Data

US 2005/0198888 A1   Sep. 15, 2005

(51) Int. Cl.
    *A01K 97/10*   (2006.01)
(52) U.S. Cl. .............................. 43/21.2; 602/16; 602/21
(58) Field of Classification Search ................. 43/21.2, 43/25; 602/16, 21
    See application file for complete search history.

(56) References Cited

U.S. PATENT DOCUMENTS

| | | | |
|---|---|---|---|
| 3,367,056 A | | 2/1968 | Johnson |
| 3,372,510 A | | 3/1968 | Arsenalut |
| 4,677,971 A | * | 7/1987 | Lindemann .................. 602/21 |
| 5,156,429 A | * | 10/1992 | Adams ......................... 294/25 |
| 5,159,775 A | * | 11/1992 | Sutula, Jr. .................... 43/21.2 |
| 5,212,900 A | * | 5/1993 | Perry .......................... 43/21.2 |
| 5,275,068 A | | 1/1994 | Wrench |
| 5,716,087 A | | 2/1998 | Backich et al. |
| 5,809,614 A | | 9/1998 | Kretser, Jr. |
| 5,846,168 A | * | 12/1998 | Murray ....................... 482/105 |
| 6,295,755 B1 | | 10/2001 | Macaluso |
| 6,422,975 B1 | * | 7/2002 | Chermak ..................... 482/46 |
| 6,435,284 B1 | | 8/2002 | Aman |
| 6,443,918 B1 | * | 9/2002 | Wang ............................ 602/5 |
| 6,564,389 B1 | | 5/2003 | Laughlin |
| 6,827,653 B1 | * | 12/2004 | Be .............................. 473/62 |

* cited by examiner

*Primary Examiner*—Teri Pham Luu
*Assistant Examiner*—Susan C. Alimenti
(74) *Attorney, Agent, or Firm*—Robert B. Hughes; Hughes Law Firm, PLLC (57) ABSTRACT

A fishing rod holding apparatus which enables the fisherman to resist lateral and twisting loads imposed on the rod by a fish which is pulling the line from one side to the other. The apparatus comprises a forearm mounting section which is connected securely to the forearm, and a hand engagement section which engages the person's hand and also enables a gripping of the handle of the rod. The hand engagement apparatus is able to rotate about a side-to-side axis of rotation, but limits movement about a back-and-forth axis of rotation.

17 Claims, 4 Drawing Sheets

FISHING ROD HOLDING APPARATUS AND METHOD

BACKGROUND OF THE INVENTION

1. Field of the Invention

The present invention relates to a hand grip apparatus and a method of using the same for better enabling a fisherman to effectively grip the fishing rod while alleviating the effect of some of the forces imposed on the rod in the performance in the task of landing the fish.

2. Background Art

When a fisherman is fishing for larger fish, a substantial amount of force from the pull of the line can be exerted at the tip end of the fishing rod to bend the rod in the direction of the pull. With regard to the stance that a fisherman will generally take when holding the fishing rod is that a right handed fisherman would commonly have his (her) left hand gripping the handle of the fishing rod at a more forward location and the fisherman's right hand would be operating the reel. The butt end of the rod would be braced against the fisherman's body, possible at the lower portion of the torso.

As the fish swims from side to side and further away and toward the fisherman, this will in some situations cause a force exerted in the fisherman's hand that is gripping the rod so that it will tend to cause a fisherman's wrist to twist from side to side as the fisherman is gripping the pole, and to rotate the pole in the person's hand. This can cause a certain amount of fatigue which would compromise the fisherman's ability to land the fish. The embodiment of the present invention is designed to alleviate this problem.

A search of the U.S. patent literature has disclosed a number of U.S. patents, some of these relating to assisting the fisherman, and some being in somewhat unrelated arts. These are as follows:

U.S. Pat. No. 6,564,389 B1 (Laughlin) shows a device to assist a person in lifting and manipulating a pot. A brace-like element 10 fits against the person's wrist. There is a forward end 12B which has a U-shape and engages the handle 102 of the pot. This is also connected to a mitt 20 which has a forward mitt portion 20B that fits around the person's hand.

U.S. Pat. No. 6,435,284 B1 (Aman) discloses a gardening tool where there is an upright handle 10 which is grasped by the person's hand, and there is a bracing member that engages the bottom of the handle and also fits over the person's wrist. There is a tool end portion, such as at the end of a hoe or several prongs that could dig into the soil.

U.S. Pat. No. 6,295,755 B1 (Macaluso) shows a fishing rod attachment that is secured to the butt end of the handle and has a support member 22 to engage the elbow. The person's hand (shown at 28) grasps the rod.

U.S. Pat. No. 5,809,614 (Kretser, Jr.) shows a weed trimming device where there is a cradle or support that fits around the forearm and is held by Velcro or the like, and the forward end of this is clamped to the drive shaft assembly of a weed trimming device. The drive shaft assembly is shown at 60 in FIG. 6.

U.S. Pat. No. 5,716,087 (Backich et al.) shows a hand operated ergonomic scoop member that has a hand gripping portion 48, and a rearwardly extending frame member 50 that engages the person's forearm to provide support.

U.S. Pat. No. 5,275,068 (Wrench) shows a device which relieves stress on the wrist joint when the person is manipulating, for example, a knife. The person's hand grasps a handle, and there is a forearm engaging member which extends rearwardly from the knife along the fisherman's forearm, and which is strapped at its end closest to the elbow around the forearm.

U.S. Pat. No. 5,212,900 (Perry) shows what is called a "limb brace support device for fishing rods." There is an articulated brace which has an upper portion which engages the upper arm, and also a forearm portion engaging the forearm. Then, at the elbow joint there is a connection that can be made to the butt end 40 of a fishing pole. The person's hand at 46 grasps the fishing pole.

U.S. Pat. No. 5,159,775 (Sutula, Jr.) shows a support handle for a fishing rod where there is an arm clamp that extends along the fishing rod, and this also clamps to the person's forearm. The hand is positioned at the end of this member and grasps the fishing rod.

U.S. Pat. No. 3,367,056 (Johnson) shows what is called "cradle support extension for short casting rod," where there is a support arm member 13 engaging the fisherman's forearm and having a cradle member 14 at its upper end engaging the upper portion of the person's forearm. The person's arm is positioned so that the hand can grasp the handle of the fishing rod.

U.S. Pat. No. 3,372,510 (Arsenault) discloses a fishing rod handling device where there is a forward hand grip portion 28 extending upwardly from the length of the pole, and a rear arm support brace 34 which grasps the person's forearm 50.

BRIEF DESCRIPTION OF THE DRAWINGS

FIG. 4 is a isometric view that is taken perpendicular to the plain of the paper on which FIG. 3 is shown, and looking toward a thumb location of the embodiment;

DESCRIPTIONS OF THE EMBODIMENTS OF THE INVENTION

Figure 1:
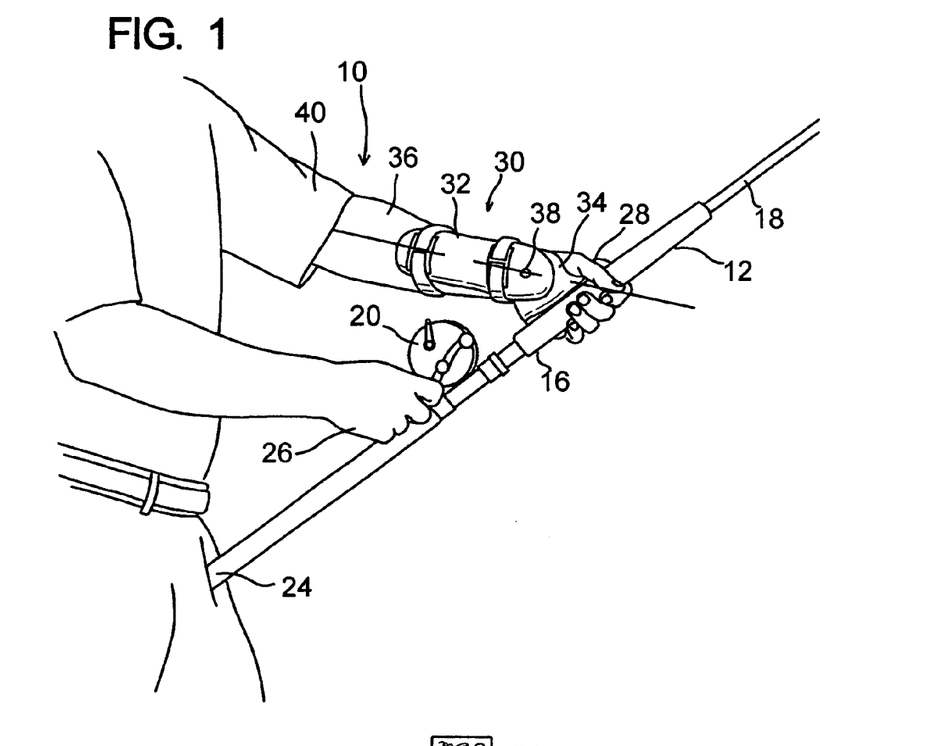
FIG. 1 is a side elevational view showing a fisherman utilizing the apparatus of an embodiment of the present invention.
Figure 2:
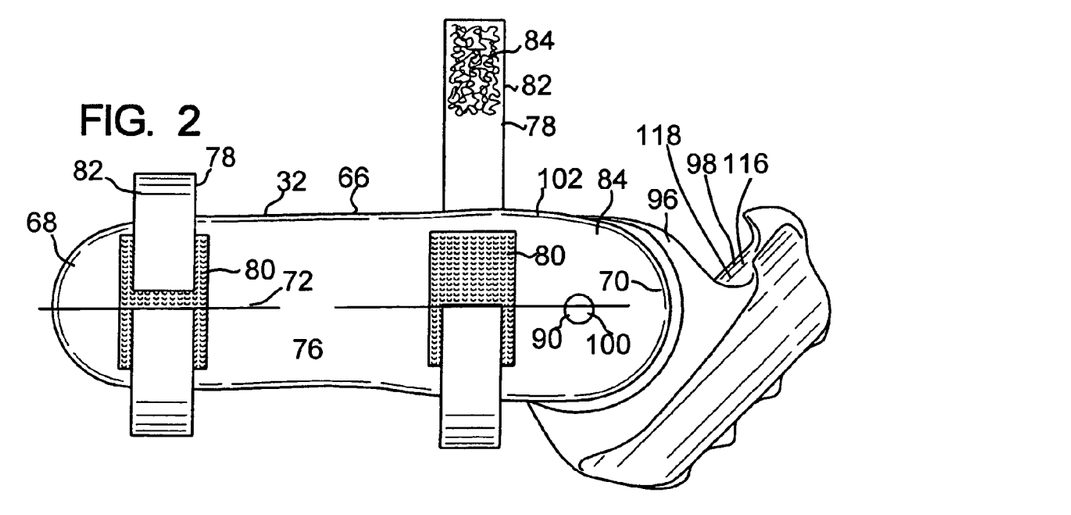
FIG. 2 is a side elevational view, with a portion thereof being drawn in an isometric fashion.

As illustrated in FIG. 1, a fisherman will commonly grasp a fishing rod by having at least one hand gripping the fishing rod and another hand operating the reel. The butt end of the rod could be positioned, for example, against the fisherman's lower torso. If a larger fish is on the line, there can be substantial forces exerted in various directions, this resulting from the pull on the line, when the fish is swimming from side to side and towards and away from the boat or dock.

The pull that the fish exerts into the line is reacted at the tip end of the fishing rod and is transmitted into the handle portion. This will often result in a bending and/or twisting force exerted on the fisherman's hand that is gripping the rod. This can prove to be rather tiring and can compromise the ability of the fisherman properly landing the fish.

This embodiment of the present invention is directed toward alleviating this problem. The embodiment is an apparatus that comprises a forearm mounting section and a hand engagement section. The forearm mounting section in turn comprises a forearm engaging portion arranged to be connected in firm engagement with the forearm of the fisherman in an operating position, and a forearm interconnecting portion which, with the forearm engaging portion in it's operating position, is located proximate to the wrist location.

The hand engagement section comprises a hand interconnecting portion and a rod connecting portion, and is arranged to be engaged by the fisherman's hand. The hand interconnecting portion and the forearm interconnecting portion are arranged to be connected to one another in a manner that in the operating position, the hand engagement section is able to rotate about a side to side apparatus axis of rotation which is coincident with, or proximate to, and substantially parallel to, a side to side hand axis of rotation about which a fisherman's hand rotates relative to the wrist. This is done in a manner that the hand engagement section is restrained from a rotational movement about an axis having a substantial alignment component perpendicular to said side to side apparatus axis of rotation. Thus, with apparatus in the operating position with the hand in engagement with the hand engagement section, the hand engagement section is restrained from movement that would cause any substantial rotational movement of the hand about a back and forth axis of rotation.

The rod engaging portion of the hand engagement section is arranged to engage a gripping location of the rod in a manner to retain the rod at least when the rod is subjected to a force directed to urge a backward rotation of the hand engagement section and react the force into the hand engagement section and into the forearm mounting section.

In this embodiment, the hand interconnecting portion has a main hand engagement surface portion which in the operating position comes into engagement with at least a portion of a surface of the main hand portion. In one arrangement the main hand engagement surface portion is located to engage at least a portion of the front palm surface of the hand.

To describe the embodiment in more detail, and with further reference to FIG. 1, there is shown a fisherman 10 who is holding an elongate fishing rod 12 having a longitudinal rod axis 14. The fishing rod 12 has a rear handle section 16 and a forward rod section 18. A reel 20 is mounted to the handle section 16 and there is a hand grip location 22 on the handle section 16.

The fisherman 10 is shown in a stance which would be typical in the situation where the fisherman is deep sea fishing, has landed a fish, and is in the middle of the task of landing the fish. The butt end 24 of the handle section 16 bears against the lower portion of the fisherman's torso (i.e. in the groin area as shown here), the right hand 26 of the fisherman is operating the reel 20 (either reeling in the fish, paying out line while placing a certain amount of drag on the line or neither of these), and the left hand 28 is located at the handgrip location 22 grasping the handle section 16.

The rod gripping apparatus 30 of this embodiment of the present invention is shown in it's operating position in FIG. 1. The apparatus 30 comprises a forearm mounting section 32, and a hand engagement section 34. The forearm mounting section 32 is in firm engagement with the fisherman's left forearm 36, and the hand engagement section 30 is engaged by the fisherman's left hand 28. The two apparatus sections 32 and 34 are joined to one another for limited relative rotation about an operating axis of rotation 38, and this will be described in more detail later herein.

Figure 10:
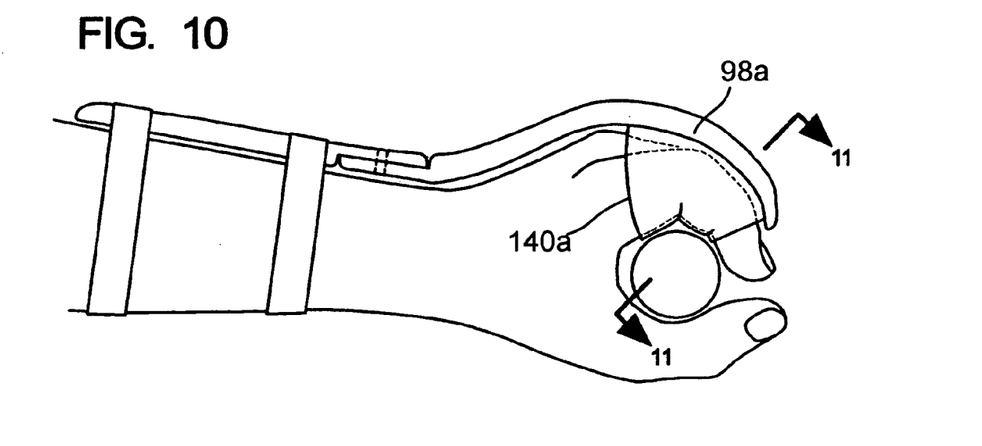
FIG. 10 is a side elevational view similar to FIG. 9, but showing a modified version of the apparatus.

When the fisherman 10 is in the position shown in FIG. 10, with a fish on the line, the fish will commonly be swimming from side to side and thus will be imparting lateral/twisting loads into the front end of the fishing rod 12. These loads are in turn reacted into the fisherman's body by the butt end 24 of the handle section 16 that engages the fisherman's lower torso, and also into the fisherman's left hand 28 that is gripping the rod 12 at the gripping location 22 to extend both a lateral force and a twisting force (a force moment) that tends to rotate the handle about the longitudinal rod axis 14 of the fishing rod. As will be described more completely later herein, the rod gripping apparatus 30 of the present invention effectively alleviates some of the stress felt in the fisherman's hand and wrist because of such imposed loads, and yet better enables the fisherman to effectively grip and position the rod while rotating the hand to various side-to-side orientations in performing the task of eventually reeling in the fish.

Figure 7:
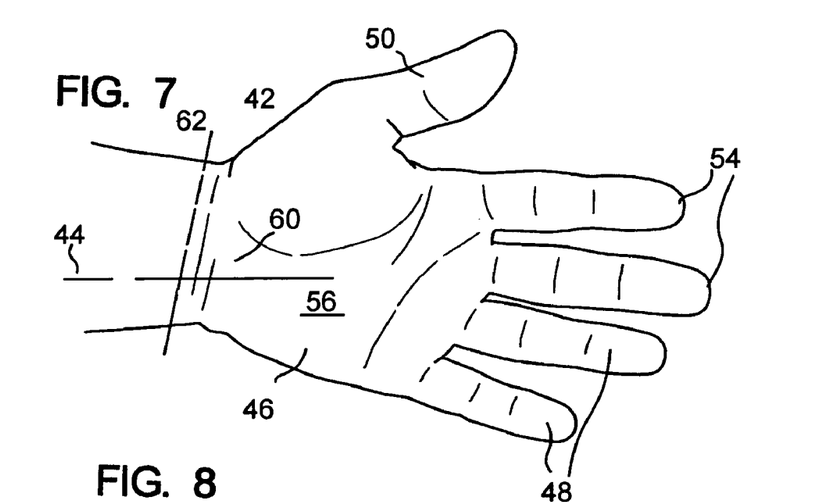
FIG. 7 is a view looking toward to palm of a fisherman's hand and lower forearm with the hand in an extended position generally parallel to the forearm.
Figure 8:
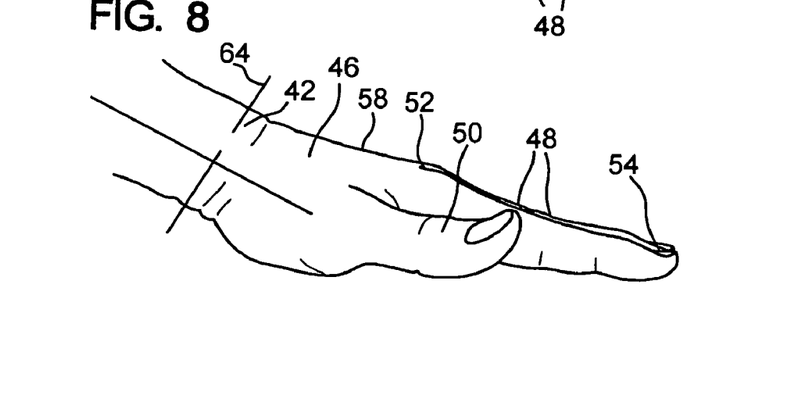
FIG. 8 is a view similar to FIG. 7, but looking at the side of the fisherman's hand where the thumb is located.

It is believed that a better appreciation of structure and function of the embodiment of the present invention will be obtained by first discussing with reference to FIGS. 7 and 8 the anatomy of the fisherman's left forearm 36 and left hand 28 as it relates to the apparatus 30 of this embodiment of the invention. Then this embodiment of the invention and its mode of operation will be described in more detail.

The left forearm 36 has a left elbow location which is identified and approximated by the numeral 40 in FIG. 1, and a wrist location 42 shown in 7 and 8. This forearm 36 also has a forearm alignment axis which is indicated at 44 in FIGS. 7 and 8 and extends from the elbow location 40 and through the center of the wrist location 42. In the following description this axis will be referred to as the longitudinal axis of orientation 44.

With reference to FIGS. 7 and 8, the fisherman's hand comprises the metacarpal portion of the hand (hereinafter for ease of expression being called the main hand portion 46), fingers 48, and a thumb 50. The fingers 48 connect to the main hand portion 46 at a finger connecting location 52 and the fingertips are indicated at 54. The main hand portion 46 has at the palm of the hand a front palm surface 56, and at the back of the hand a back hand surface 58. The heel 60 of the hand is at the base of the palm surface 56 near the wrist location 42.

To facilitate the description of the embodiment there will be established three axes of orientation, and reference is again made to FIGS. 7 and 8 which show the fisherman's left hand 28 and the forward part of the forearm 36, with the fisherman's fingers 48 being in the extended position and the front surfaces of the fingers 48 being aligned in approximately the same plane as the plane occupied by the front palm surface 56. There is the aforementioned longitudinal axis of orientation 44, and a vertical axis of orientation 62 which passes through the longitudinal axis of orientation 44 at the wrist location 42 at a right angle to the longitudinal axis of orientation 44 and is nearly parallel to the plane occupied by the front palm surface 56 as shown in the position of FIG. 8. (The term "vertical axis" is simply a term selected for convenience and does not relate necessarily to orientation relative to the earth's gravity.) A transverse axis of orientation axis 64 passes through the longitudinal axis 44 at the same location as does the vertical axis of orientation 62, is perpendicular to both of the longitudinal axis of orientation 44 and the vertical axis of orientation 62, and is approximately perpendicular to the front palm surface 56 in the position shown in FIGS. 7 and 8.

In the this embodiment of the present invention, we will consider primarily two modes of rotational movement of the fisherman's hand 28 at the wrist location 42 relative to the forearm 36. One mode of rotational movement will be considered as the "back and forth movement", and the second mode is the "side to side movement". The back and forth rotational movement will be considered as rotational movement about a "back and forth axis of rotation" which is coincident with the vertical axis of orientation 62. Thus, the back and forth movement about the back and forth axis of rotation occurs where the movement of the hand 28 is such that the front palm surface 56 of the hand moves in a direction that is perpendicular to the front palm surface 56 of the hand 28.

Then the "side to side" rotational movement occurs when the hand 28 is being rotated about the transverse axis of orientation 64. Thus, when the fisherman is rotating the hand 28 at the wrist location 42 in the side to side rotational movement, with the hand extended and parallel with the longitudinal axis 44, the palm surface 56 of the hand is moving in a plane parallel to the orientation of the palm surface 56.

Thus, in the text which follows, the back and forth movement of the hand 28 will be considered to be about a "back and forth" axis of rotation that coincides with the vertical axis of orientation 62 will be given the same numerical designation 62. In like manner, since the side to side movement of the hand will be considered to be about a side to side axis of rotation that is coincides with the transverse axis 64, the side to side axis of rotation shall be given the same numerical designation 64.

With the foregoing text being given as background information, let us now turn our attention to FIGS. 2 through 6 to describe this embodiment of the present invention in more detail.

The forearm mounting section 32 comprises a forearm engaging portion 66 which has a rearward end 68 and a forward end 70, and which can be considered as having a rearward to front forearm alignment axis 72 that would be generally parallel to the longitudinal axis 40 of the forearm 36 when engaging the forearm in the operating position. The forearm engaging portion 66 has a concave inner forearm engaging surface 74 and a convex outer surface 76. The inner surface 74 is contoured to generally match the contour of the fisherman's forearm at the location to which it is mounted, which in this embodiment is that portion of the forearm surface that is aligned with the palm surface 56 of the fisherman's hand 28.

The forearm mounting section 32 is securely connected to the forearm by means of a pair of spaced Velcro strap connections 78. There are spaced Velcro patches 80 that are connected at spaced locations on the convex outer surface 76, and the straps 82 have end Velcro portions 84 that attach to the patch 78.

The forearm mounting section 32 also comprises a forwardly positioned forearm interconnecting portion 84 by which the forearm engaging section 32 is pivotally connected to the hand engagement section 34. This forearm interconnecting portion 84 can be considered as a forward extension of the forearm engaging portion 66 that has a more flattened configuration to better match the contour of the wrist location 42 of the fisherman's hand 28. The inwardly facing surface portion of the forearm interconnecting portion 84 is formed with a shallow recess 86 having a contact surface 88 so as to be spaced a short distance away from the hand surface at the wrist location 42 of the fisherman when the apparatus 30 is in it's operating position engaging the fisherman's forearm and hand.

At a central location in this contact surface 88, there is a pivot location 90 which has a through opening to receive a pivot connecting pin. The recessed portion 86 has a curved edge portion 92 which, as will be described later herein, is proximate to an interconnecting portion of the hand engagement section 34.

The hand engagement section 34 comprises a hand interconnecting portion 96 by which the hand engagement portion is pivotally connected to the interconnecting portion 84 of the forearm mounting section 32, and a rod engaging portion 98 to engage the handle section 16 of the fishing rod 12. Also, the hand interconnecting portion 96 and the rod engaging portion 98 can be considered as having a transition portion 100.

The hand interconnecting portion 96 has a main hand engagement surface portion 102 which, with the apparatus 30 in it's operating location bears against at least the heel portion of the fisherman's hand. The hand interconnecting portion also has a contact surface portion 104 that is on the opposite side of the hand interconnecting portion 96 relative to the main hand engagement surface portion 102 to engage the contact surface 88 of the forearm interconnecting portion 84. The hand interconnecting portion 96 has a centrally located pivot location 106 which receives a connecting pivot pin 108, which was mentioned previously herein as also extending through the opening at the pivot location 90 of the interconnecting portion 84 of the forearm mounting section 32.

The axis of rotation defined by the pivot pin 108 is the same as the operating axis 38 that was mentioned earlier in this text. This operating axis of rotation 38 is located so that with the apparatus 30 in it's operating position the axis of the rotation 38 that is defined by the pivot pin 108 is at, or proximate to, the side to side axis of the rotation 64 of the hand, and as will be described later herein, it restrains the motion of the hand engagement section 34 to rotational movement in a rotational side to side movement generally matching the side to side movement of the hand 28 with the apparatus 30 in it's operating position. The contact surface 104 of the hand interconnecting portion 96 matches the contour of the contact surface 88 of the interconnecting portion 84 of the forearm engaging section 32 so that these surfaces 88 and 104 can rotate relative to one another as the hand engagement section 34 rotates relative to the forearm engaging section 32. For example, both of these surfaces 88 and 104 can be made flat, or these could be made as matching conical surfaces.

The rod engaging portion 98 of the hand engagement portion 34 extends outwardly from the hand interconnecting portion 96 and is formed as a wall 114 which has a concavely curved inner surface 116 which defines an elongate laterally aligned recess 118 which in cross sectional configuration has an interior rounded surface that generally matches the circular configuration of the handle section 16 of the fishing rod 12. This inner surface 116 is made with a high friction material such as a rubber or rubber like surface, to resist the rotational twisting of the axis of the rod handle 16 about the longitudinal rod axis 14 when the fisherman is gripping the handle 16.

The curved wall of the 114 of the pole engaging portion 98 has an outer generally curved convex gripping surface 122 which is shaped to be gripped by the fingers of the 48 of the fisherman's left hand 28. In the particular form shown herein, the gripping surface 122 is formed with finger receiving grooves 124, 126, 128, and 130 which receive, respectively, the index finger, the middle finger, and the ring finger, and the little finger, and the little finger.

Figure 6:
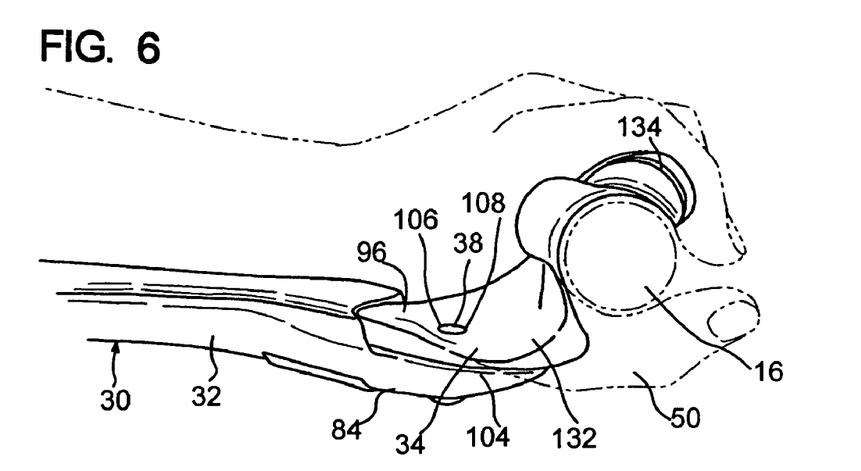
FIG. 6 is a view similar to FIG. 4, but showing the fisherman's forearm and hand with the apparatus in it's operating position, and also showing the fishing rod being gripped by the fisherman.

At a location adjacent to the index finger location, there is a side thumb recess 132 to accommodate the inner portion of the fisherman's thumb 50 and to permit the thumb 50 to be positioned around the fishing rod handle 16 when the handle is positioned in the handle receiving recess 116, as shown in FIG. 6. Also, it will be seen in FIG. 6 that there is a raised portion 134 which is positioned as seen in FIG. 6, upwardly and somewhat forwardly of the thumb recess 132 to engage the fisherman's hand 28 at the location near the base of the index finger 124.

To describe now the method of this embodiment, the fisherman 10 first positions the forearm mounting section 32 of the apparatus so that forearm engaging portion 66 is positioned against the forearm 36 with the alignment axis 72 forearm mounting section 32 being generally aligned with the longitudinal axis of orientation 44 of the forearm 36. Then the Velcro straps 78, positioned at forward and rearward locations on the forearm engaging portion 66 are strapped tightly around the forearm 36 and the forearm engaging portion 66 to hold the forearm engaging portion 66 firmly against the forearm 36. The positioning of the forearm engaging portion 66 relative to it's location along the longitudinal axis of orientation 44 of the forearm 36 is such that the pivot location 90 of the interconnecting portion 84 of the forearm engaging portion 34 is coincident with (or in proximity with) the side to side axis of rotation 64 of the left hand 28. This places the hand gripping apparatus 30 in it's proper operating position.

As shown in FIG. 1, the fisherman has the gripping apparatus 30 mounted to his left forearm 36. This fisherman 10 as shown is right handed, so (as mentioned previously), in the normal mode of operation, the fisherman would have the rod mounted as shown in FIG. 1, with the left hand 28 gripping the hand engagement section 134 of the gripping apparatus 30 to in turn grip the rod handle 16 at the gripping location 22, the right hand 26 being used to operate the reel 20, and the butt end 24 of the handle 16 engaging the fisherman's lower torso, possibly in the groin area. Obviously, if the fisherman is left handed, then the same type of stance would be assumed by the fisherman 10 but in the configuration of a mirror image, shifting the left to the right, etc.

With the apparatus 30 in this operating position, the fisherman now grasps the fishing rod 12 and operates the fishing rod 12 in the customary manner when he (she) is fishing. Let us assume that the bait of the fisherman has now been taken by a fish and the fish is swimming in various directions toward and away from the boat, from side to side, at greater or lesser depths etc. As this happens, the tension force on the fish line is pulling the outer end portion of the rod in various directions and at various slants relative to the horizontal. Let us assume that in the situation of FIG. 1, the fish is moving off to the left and pulling the outer end of the rod 12 toward the left. When this occurs, with the butt end 24 of the rod engaging the fisherman's body and thus being essentially stationary, the force exerted on the end of the rod tends to pull the gripping location 22 of the handle 16 to the left.

If the apparatus 30 were not used, this force would be pushing against the fisherman's left hand 28 to be pushed to the left, so that it would tend to rotate the hand 28 backwards relative to the wrist 42, with this rotation taking place about the back and forth axis 62 of the fisherman's left hand 28. Also, with the front end of the rod being deflected downwardly and pulled laterally there is a twisting force transmitted into the handle 16 to twist the handle 16 about the longitudinal rod axis 14 which in turn tends to twist the gripping hand 28 in a direction to tend to rotate the hand 28 about the back and both axis of rotation 62. The repeated application of this force on the fisherman's left hand can eventually prove tiring, and the resulting fatigue can compromise the fisherman's physical ability to operate the rod 12 in an optimized manner.

However, with the apparatus of the present invention being mounted to the fisherman's left forearm 36, the force that is exerted from the tip of the rod down to the hand gripping portion 22 of the handle 16 is now applied into the rod engaging portion 98 of the hand engagement section 32 to transmit this force through the interconnecting portions 84 and 96, to the forearm engaging portion 66 into the forearm 36. It is not possible, however, to rotate the hand engagement section 34 about a back and forth axis rotation since the contact surface 88 and the contact surface 104 remain in contact with one another and are held together by means of the connecting pivot pin 108.

Figure 3:
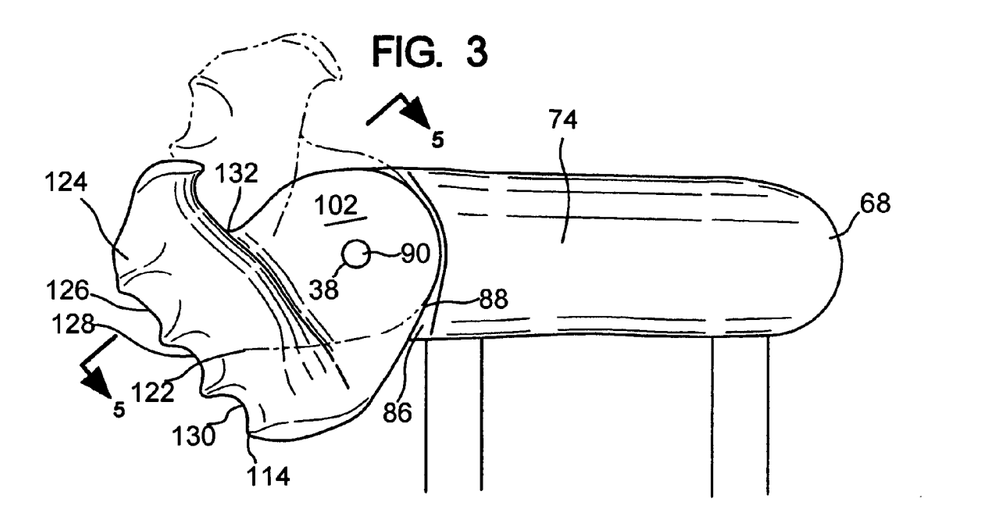
FIG. 3 is a elevational view similar to FIG. 2 except that it shows that the apparatus of this embodiment from the opposite side, and also with the hand engagement portion being shown in solid lines in one position, and broken lines in another position.
Figure 4:
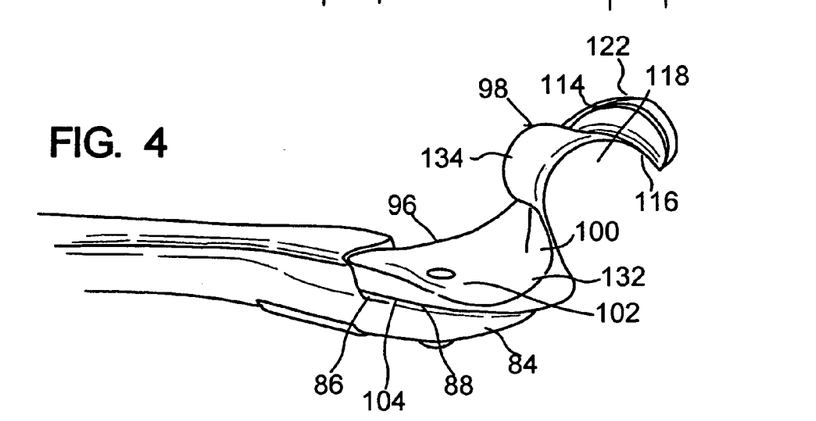

However, at the same time, rotation of the hand engagement section 34 about the side to side operating axis 38 is not restrained, and this mode of rotation is shown in FIG. 3. Thus the fisherman is able to maintain the same grip on the handle 16 as he is pulling the rod 18 up towards his body and more toward a vertical position, or lowering the rod 18 downwardly toward a more horizontal position, as shown in FIG. 1.

Figure 5:
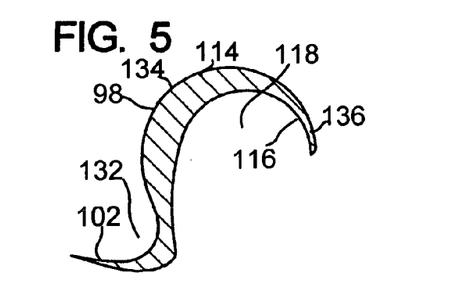
FIG. 5 is a sectional view taken along line 5—5 of FIG. 3, but with this view being rotated from it's cross section orientation in FIG. 3, so that it is at the same orientation as in FIG. 4.

To explain another facet of the present invention, reference is made to FIG. 5. It can be seen that FIG. 5 is a sectional view taken along the lines 5—5 of FIG. 3, and it has in placed in an orientation which would correspond to FIG. 4.

It can be seen that the inter surface 116 that forms the recess 118 is in a nearly 180 degree curve so that it can snuggly grip the handle grip portion 22 of the rod. The apparatus 30 can be made of plastic or some other material, and be molded into the shape as shown in FIG. 5 in the other drawings. In this particular configuration the outer most end finger portion 136 has a lesser thickness dimension than a middle portion of the rod engaging portion 98. Thus, the fingertip portion 136 has a moderate amount of flexibility so that when the fingertip portion of the fisherman's fingers is gripping the outer end portion 136 of the rod engaging portion 98, the fisherman is able to squeeze the outer portions of the fingers inwardly and have the feel of grasping the rod handle grip portion 122 as well as applying a gripping force to prevent rotation of the rod 12 about the longitudinal rod axis. In FIG. 5, only an edge portion of the hand engagement surface portion 102 is shown, and it can be seen that from examining the section line at FIG. 5, that this represents the tapering of the hand interconnecting portion 96 to a narrow edge.

A second embodiment of the present invention will now be described with reference to FIGS. 9–11. Components of the second embodiment which are similar to, or correspond to, components of the first embodiment, will be given like numerical designations, with an "a" suffix distinguishing those of the second embodiment.

The apparatus 30a of the this second embodiment comprises a forearm engaging section 32a and a hand engagement section 34a. The apparatus 30a of the first embodiment differs from the first embodiment in that the forearm mounting section 32a and the hand engagement 34a are positioned on the forearm 36 and the hand 28, respectively, at side locations opposite to the positions of the forearm mounting section 32 and hand engagement section 34 of the first embodiment. Thus, the hand engagement section 34a is in engagement with the back surface 58 of the main hand portion 46, and the forearm mounting section 32a is positioned on the side surface of the forearm 36 that is in alignment with the back surface portion 58 of the fisherman's main hand portion 46.

The forearm mounting section 30a has generally the same configuration as the forearm mounting section 30 of the first embodiment, except possibly for the contouring of the inside contact surface of the forearm mounting section 32a to conform more closely to the contours of that surface portion of the person's forearm 36. In like manner, the main hand engagement surface portion 102a of the hand engagement section 34a has a contact surface contour which matches the configuration of the back surface 58 of the fisherman's hand.

In the first embodiment the forward part of the hand engagement section 34 comprises a forward end portion that is designated as a rod engagement portion 98 that has a transition portion 100 connecting to the hand interconnecting portion 96. This second embodiment differs from the first embodiment in that the forward portion 98a of the hand engagement section 34a does not function directly as a rod engaging portion such as indicated at 98 in the description of the first embodiment. Rather, the forward portion of the hand engagement section 34 functions as a finger positioning and support function for the person's fingers 48 to enable the fingers 48 themselves to engage the rear handle section 16 of the rod 12, and only indirectly engages the rod handle 16 in the operating position. Thus, this forward hand engagement portion 98a of the second embodiment has a contour matching the back surfaces of the fingers 48 when these fingers 48 are in the gripping position, as shown in FIGS. 9 and 10, grasping the rod handle 16.

The forward interconnecting portion 84a of the forearm section 32a and the hand interconnecting portion 96a of the hand engagement section 38a function basically in substantially the same way as the corresponding components 84 and 96 of the first embodiment by providing for a limited relative rotation around a pivot location 90a which corresponds to pivot location 90 of the first embodiment. Thus, the side to side motion of the person's hand is permitted while the back and forth motion of the hand is restrained by the hand engagement section 34.

Figure 9:
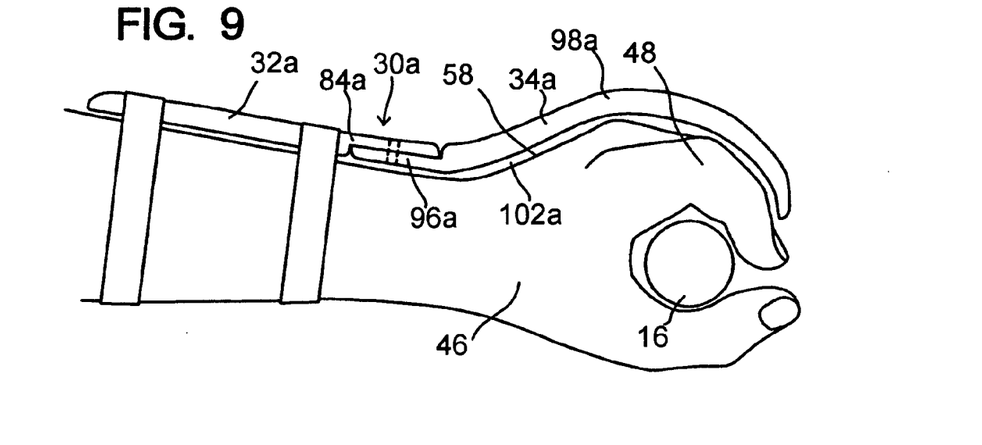
FIG. 9 is a side elevational view similar to FIGS. 6, showing a second embodiment of the present invention in its operating position mounted to a person.

In the operation of this second embodiment, the apparatus 30a is mounted to the person's forearm 36 as shown in FIGS. 9 and 10, with the forearm mounting section 32a being attached to the forearm 36 by the straps 78a (in these embodiments Velcro straps) in a manner similar to the first embodiment. This automatically positions the hand engagement section 34a so that it is located adjacent to the back surface 58 of the main hand portion and also the back surface portion of the person's fingers 48. Thus the person grasps the rod handle 16 directly by the fingers engaging the rod handle 16.

Thereafter, the fisherman operates the fishing rod 12 in the customary manner as described above. As the fish line is pulled in various directions by the fish, the person's hand and fingers are supported by the hand engagement portion 34a in the gripping position as shown in both FIGS. 9 and 10. The fisherman grips the rod handle 16 with the person's fingers 48 and thumb 50 pressing against the surface of the fishing rod handle 16. The forward portion 98a of the hand engagement section 34a may in one configuration be to some extent be resilient and be positioned so that there is an initial biasing force provided by the forward hand engagement portion 98a to assist the person in gripping the rod handle 16.

It would be possible to provide an auxiliary fitting that would extend from the backside of the hand engagement section 34a around or partly around the portion of the person's hand at or closer to the front palm surface 56, and partly extending to the region of the thumb 52.

Figure 11:
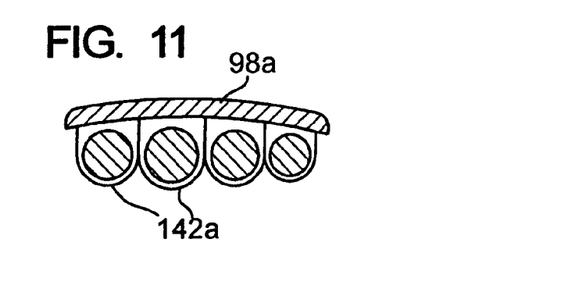
FIG. 11 is a sectional view taken along line 11—11 of FIG. 10.

FIGS. 10 and 11 show substantially the same arrangement as in FIG. 9 except that the forward hand engaging portion 98a is provided with a finger glove member 140a that is attached to the adjacent surface of the hand engagement portion 98a and extends outwardly there from to form separate finger engaging components 142a. The surface of the finger glove member 140a could be made of a high friction material so as to improve the grip of the person on the rod handle 16 to prevent rotational movement of the rod along the longitudinal axis of the pole 12. Further, this glove member could be extended rearwardly to engage the palm of the person's hand so as to maintain the person's hand in engagement with the hand engagement section 34a.

Thus, the overall operation the second embodiment of the present invention is substantially similar to the first embodiment in its basic function of permitting the maneuverability of the person's hand gripping the rod in the side to side motion which usually occurs when the fisherman is pulling the rod 12 back toward the fisherman or letting the rod move outwardly and downwardly from the fisherman. Yet the back force component and also the twisting force components that are imposed on the person's hand by the action of the fish pulling on the line and moving from one side to the other are resisted to assist the person in reliably and maneuvering the rod 12 gripping the rod handle 16.

It is obvious that various modifications could be made to the embodiments of the present invention. For example, the forearm engaging portion 32 or 32a could be modified in various ways to firmly engage the forearm 36. Also, while the Velcro straps 78 and 78a are used to connect the forearm engaging portion 66 to the forearm 36, other fastening means and connectors could be used. Further, various modifications could be made to the hand engagement section 34 and 34a as well as to enter connecting portions 84, 96, 84a and 96a, since there are various ways of connecting two members together to rotate about a single axis of rotation.

I claim:

1. A combination fishing rod and gripping apparatus to assist a fisherman in gripping a handle of the fishing rod, with said fisherman having a forearm which has a longitudinal forearm axis of orientation, a rear elbow location and a rod gripping hand connected thereto at a wrist location, and with the hand having at the wrist location a side to side hand axis of rotation and a back and forth hand axis of rotation, and with the hand comprising a main hand portion with a front palm surface and a back surface and comprising a finger portion that has a base connecting finger location and an outer finger portion, said combination comprising:

a) a fishing rod comprising a rear handle section and a forward rod section, and having a longitudinal rod axis;

b) a gripping apparatus having a rear to front apparatus alignment axis with said apparatus alignment axis generally aligned with the longitudinal axis of orientation when mounted in an operating position to said forearm;

c) said apparatus comprising a forearm mounting section which comprises a forearm engaging portion arranged to be connected in engagement to the forearm in said operating position and a forearm interconnecting portion which, with the forearm engaging portion in the operating position, is located proximate to the wrist location;

d) said apparatus further comprising a hand engagement section which comprises a hand interconnecting portion and a forward hand engaging portion, and which is arranged to be engaged by the hand in an operation position;

e) said hand interconnecting portion and said forearm interconnecting portion being arranged to be connected to one another in a manner that in the operating position the hand engagement section is able to rotate about a side to side apparatus axis of rotation which is coincident with, or proximate to, and substantially parallel to, the side to side hand axis of rotation, and the hand engagement section is restrained from rotational movement about a second axis having a substantial alignment component perpendicular to said side to side apparatus axis of rotation, in a manner that in the operating position with the hand of the person in engagement with the hand engagement section, the hand and the hand engagement section are limited in movement about said back and forth hand axis of rotation;

f) said forward hand engaging portion of said hand engagement section comprising a hand engaging member having a concavely shaped inner surface having at least front and rear surface portions defining a laterally aligned, laterally facing recess that has oppositely positioned end openings and a laterally facing recess opening so that the rod can be moved laterally through the recess opening into the recess with the rod extending through end openings, and the rod can be moved laterally from the recess;

g) said hand engagement section being arranged so that with the hand being engaged with the hand engaging portion in the operating position, the fingers of the hand are in engagement with the forward hand engaging portion, and the thumb of the hand is able to be positioned in a retaining position across the recess opening, and then with the thumb being moved to a release position away from the recess opening the rod can be moved through the release opening and out of the recess; and h) said combination being arranged so that with the forearm mounting section being connected in engagement with the forearm, with the hand in engagement with the hand engagement section in its operating position, and with the rod being in the operating position in the hand engagement section, the person's hand is able to exert a force on the rod while rotating the hand engagement section about the side to side axis, while reacting forces that would cause rotation about the back and forth axis into the gripping apparatus so as to reduce the effect of these forces on the person's hand and forearm.

2. The combination as recited in claim 1, wherein said hand interconnecting portion has a main hand engagement surface portion which in the operating position comes into engagement with at least a portion of a surface of the main hand portion.

3. The combination as recited in claim 2, wherein said main hand engagement surface portion is located to engage at least a portion of the front palm surface of the hand.

4. The combination as recited in claim 2, wherein said main hand engagement surface portion is located to engage at least a portion of the back surface of the hand.

5. The combination as recited in claim 2, wherein there is at said side to side apparatus axis of rotation a pivot member connecting said hand interconnecting portion with said forearm interconnecting portion.

6. The combination as recited in claim 2, wherein said hand interconnecting portion and said forearm interconnecting portion have contact surfaces arranged to limit relative movement between said hand interconnecting portion and said forearm interconnecting portion to rotational movement about said side to side apparatus axis of rotation.

7. The combination as recited in claim 1, wherein said hand interconnecting portion and said forearm interconnecting portion have contact surfaces arranged to limit relative movement between said hand interconnecting portion and said forearm interconnecting portion to rotational movement about said side to side apparatus axis of rotation.

8. The combination as recited in claim 2, wherein said forearm engaging portion has a forearm contact surface that forms with said main hand engagement surface portion a substantially longitudinally aligned contact surface.

9. The combination as recited in claim 1, wherein said forward hand engaging portion comprises a handle engaging portion having a hand gripping surface which in the operating position is positioned to be engaged at least in part by a front surface portion of the finger portion of the hand.

10. The combination as recited in claim 9, wherein said hand gripping surface is contoured to substantially match the front surface portion of the finger portion so as to be shaped in a contour of the hand in a rod gripping position.

11. The combination as recited in claim 9, wherein said rod engaging portion has a hand gripping surface which in the operating position is positioned to be engaged at least in part by a front surface portion of the finger portion of the hand.

12. The combination as recited in claim 11, wherein said hand gripping surface is contoured to substantially match the front surface portion of the finger portion so as to be shaped of the hand in a rod gripping position.

13. The combination as recited in claim 1, wherein said hand engagement section is formed with an open thumb accommodating region to receive a thumb of the hand in a manner that the thumb and can be positioned to enable the thumb to retain the rod in the receiving recess and can be moved laterally free of the hand engaging section.

14. The combination as recited in claim 1, wherein at least a portion of rod engaging portion that is engaged by said an outer finger portion of said finger portion of the hand has at least a moderate degree of flexibility so that a fisherman is able to apply a gripping force with the hand to squeeze said at least a portion of said rod engaging portion inwardly toward the fishing rod.

15. The combination as recited in claim 1, wherein said rod receiving recess is defined by a rod receiving surface made of a high friction material to resist a twisting rotational movement of the rod in the rod receiving recess.

16. The combination as recited in claim 1, wherein said hand engagement section comprises a main hand engaging portion and a finger engaging portion, with said main hand engaging portion and said finger engaging portion engaging, respectively, a back surface of the main hand portion and a back surface of the hand finger portion, said finger engaging portion being contoured to engage the finger portion of the hand when in a gripping position.

17. The combination as recited in claim 16, wherein said hand engagement section further comprises a glove portion positioned to be able to engage at least a finger portion of the person's hand with the hand being positioned adjacent to the hand engagement section.

* * * * *